United States Patent
Leung et al.

(10) Patent No.: US 6,339,768 B1
(45) Date of Patent: Jan. 15, 2002

(54) EXPLOITATION OF SUBSUMPTION IN OPTIMIZING SCALAR SUBQUERIES

(75) Inventors: Ting Yu Leung; Mir Hamid Pirahesh, both of San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/133,335

(22) Filed: Aug. 13, 1998

(51) Int. Cl.[7] ............................................. G06F 17/30
(52) U.S. Cl. .................................. 707/2; 707/3; 707/4
(58) Field of Search ........................... 707/2, 3, 4, 100, 707/102, 201

(56) References Cited

U.S. PATENT DOCUMENTS

| | | | |
|---|---|---|---|
| 4,631,673 A | | 12/1986 | Haas et al. .................. 707/100 |
| 5,367,675 A | * | 11/1994 | Cheng et al. ................... 707/3 |
| 5,592,668 A | | 1/1997 | Harding et al. ................. 707/2 |
| 5,615,361 A | * | 3/1997 | Leung et al. ................... 707/3 |
| 5,666,526 A | | 9/1997 | Reiter et al. ................... 707/2 |
| 5,675,785 A | | 10/1997 | Hall et al. .................... 707/102 |
| 5,751,949 A | | 5/1998 | Thomson et al. ........... 713/201 |
| 5,752,018 A | | 5/1998 | Sheffield ........................ 707/2 |
| 6,032,143 A | * | 2/2000 | Leung et al. ................... 707/2 |

OTHER PUBLICATIONS

A logic database system with extended functionality by Lee et al. Dept. of Computer Science, Keoul Korea, (IEEE publication 1996) pp. 414–419.*

Systematic generation method and efficient representation of proximity relations for fuzzy relational database systems by Kim et al. Database Section, ETRI, Taejon South Korea (IEEE publication 1994), pp. 549–555).*

Date, C.J. with Darwen, H., "The Role of Functional Dependence in Query Decomposition," Relational Database Writings 1989–1991, Chapter 10, 1992, pp. 133–154.

Paulley, G.N. et al., "Exploiting Uniqueness in Query Optimization," Proceedings of the IEEE '94 Conference on Data Engineering, Houston, Texas, 1994, pp. 68–79.

Pirahesh, H. et al. "Extensible/Rule Based Query Rewrite Optimization in Starburst," Proceedings of the ACM SIGMOD '92 International Conference on Management of Data, San Diego, CA, 1992, pp. 39–48.

* cited by examiner

Primary Examiner—Diane Mizrahi
(74) Attorney, Agent, or Firm—Gates & Cooper LLP

(57) ABSTRACT

An optimization technique for SQL queries. A query is analyzed to determine whether it includes one or more scalar subqueries and one or more existential subqueries. The scalar subqueries and the existential subqueries are transformed into join operations using subsumption, and the join operations are merged into a single join query block. The join query block can then be executed in the computer to efficiently retrieve data from the relational database.

54 Claims, 14 Drawing Sheets

400

| KEYCOL | COL1 | COL2 | COL3 |
|--------|------|------|------|
| 10 | 1 | 2 | 3 |
| 20 | 2 | 4 | 6 |
| 30 | 1 | 2 | 4 |
| 40 | 2 | 6 | 4 |

FIG. 6

| KEYCOL | COL1 | COL2 | COL3 |
|---|---|---|---|
| 10 | 1 | 2 | 3 |
| 20 | 2 | 4 | 6 |
| 30 | 11 | 22 | 44 |
| 40 | 2 | 6 | 4 |

600

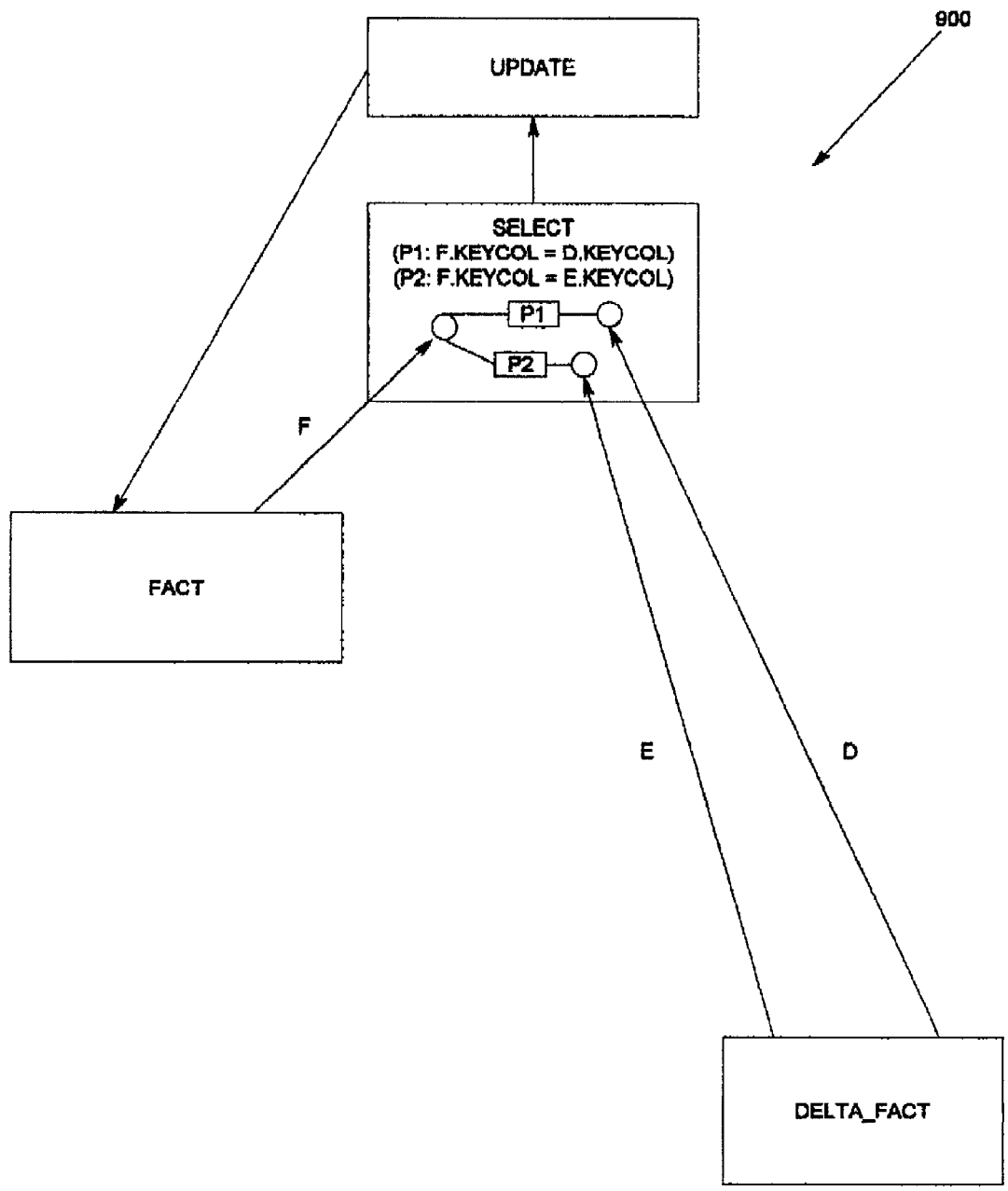

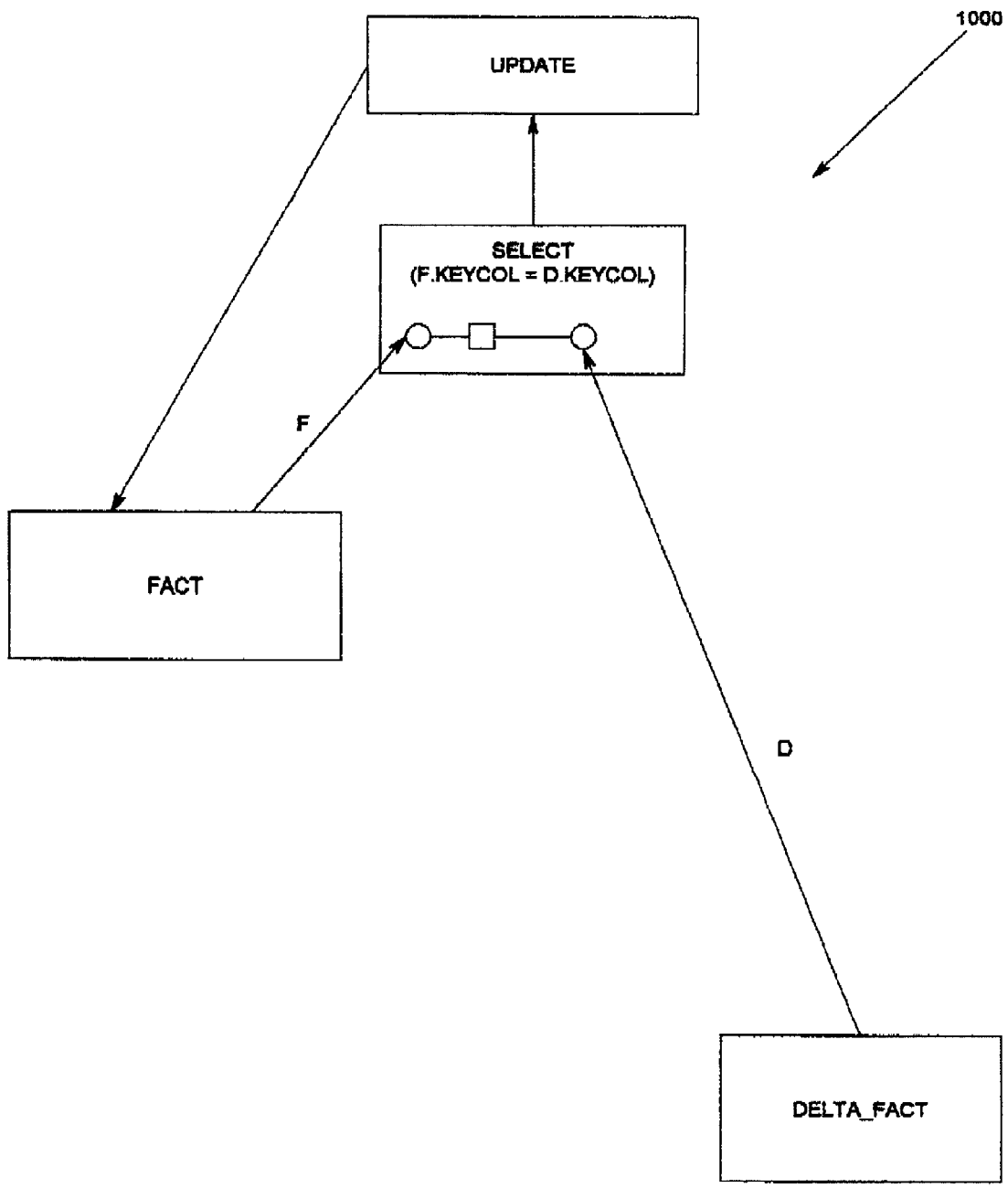

EXPLOITATION OF SUBSUMPTION IN OPTIMIZING SCALAR SUBQUERIES

BACKGROUND OF THE INVENTION

1. Field of the Invention

This invention relates in general to database management systems performed by computers, and in particular, to the optimization of scalar subqueries in a relational database management system.

2. Description of Related Art

Computer systems incorporating Relational DataBase Management System (RDBMS) software using a Structured Query Language (SQL) interface are well known in the art. The SQL interface has evolved into a standard language for RDBMS software and has been adopted as such by both the American Nationals Standard Organization (ANSI) and the International Standards Organization (ISO).

In RDBMS software, all data is externally structured into tables. The SQL interface allows users to formulate relational operations on the tables either interactively, in batch files, or embedded in host languages such as C, COBOL, etc. Operators are provided in SQL that allow the user to manipulate the data, wherein each operator operates on either one or two tables and produces a new table as a result. The power of SQL lies on its ability to link information from multiple tables or views together to perform complex sets of procedures with a single statement.

In the SQL standard, a SELECT statement is used to retrieve data and generally comprises the format: "SELECT <clause>FROM <clause>WHERE <clause>GROUP BY <clause>HAVING <clause>ORDER BY <clause>." The clauses generally must follow this sequence, but only the SELECT and FROM clauses are required. The result of a SELECT statement is a subset of data retrieved by the RDBMS software from one or more existing tables or views stored in the relational database, wherein the FROM clause tells the RDBMS software the name of the table or view from which data is being selected. The subset of data is treated as a new table, termed the result set, which typically comprises a temporary table. In general, the items specified in the SELECT clause of the SELECT statement determine the columns that will be returned in the result table from the table(s) identified in the FROM clause.

The WHERE clause determines which rows should be returned in the result table. Generally, the WHERE clause contains a search condition that must be satisfied by each row returned in the result table. The rows that meet the search condition form an intermediate set, which is then processed further according to specifications in the SELECT clause. The search condition typically comprises one or more predicates, each of which specify a comparison between two values comprising columns, constants or correlated values. Multiple predicates in the WHERE clause are themselves typically connected by Boolean operators.

A join operation makes it possible to combine tables or views by combining rows from one table or view to another table or view. The rows, or portions of rows, from the different tables or views are concatenated horizontally. The join operation is implied by naming more than one table or view in the FROM clause of a SELECT statement. Although not required, join operations normally include a WHERE clause that identifies the columns through which the rows can be combined. The WHERE clause may also include a predicate comprising one or more conditional operators that are used to select the rows to be joined.

In a SELECT-FROM-WHERE query, identifying situations where at most one tuple is retrieved by the query (termed a "1-tuple condition") permits important query transformations and optimizations. Certain instances of the identification of 1-tuple conditions have been performed in the prior art, as disclosed in the following publications and patent, which are incorporated by reference herein:

1. Hamid Pirahesh, Joseph Hellerstein, and Waqar Hasan, "Extensible/Rule Based Query Rewrite Optimization in STARBURST," Proceedings of ACM SIGMOD '92 International Conference on Management of Data, San Diego, Calif., 1992;
2. Hugh Darwen, "The Role of Functional Dependence in Query Decomposition," Relational Database Writings 1989–1991, Chapter 10, pp. 133–154, 1992;
3. G. N. Paulley and Per-Ake Larson, "Exploiting Uniqueness in Query Optimization," Proceedings of IEEE '94 International Conference on Data Engineering, Houston, Tex., 1994, pp. 68–79; and
4. U.S. Pat. No. 5,615,361, issued Mar. 25, 1997, to T. Y. Leung, M. H. Pirahesh, D. E. Simmen, L. G. Strain and S. Tiwari, entitled "Exploitation of Uniqueness Properties using a 1-Tuple Condition for the Optimization of SQL Queries".

The 1-tuple condition has been heavily relied upon for transforming scalar subqueries into join operations. However, there is a need in the art for improved methods of optimizing scalar subqueries, and in particular, to the optimization of scalar subqueries in UPDATE statement.

SUMMARY OF THE INVENTION

To overcome the limitations in the prior art described above, and to overcome other limitations that will become apparent upon reading and understanding the present specification, the present invention discloses a method, apparatus, and computer program carrier for optimizing SQL queries. A query is analyzed to determine whether it includes one or more scalar subqueries and one or more existential subqueries. The scalar subqueries and the existential subqueries are transformed into join operations by exploiting subsumption methods, and the join operations are merged into a single query block, which allows the generation of more efficient execution plans for retrieving data from the relational database.

It is an object of the present invention to optimize SQL queries that include both scalar subqueries and existential subqueries. More specifically, it is an object of the present invention to transform one or more scalar subqueries into one or more join operations, to transform one or more existential subqueries into one or more join operations, and to merge the resulting join operations into a single query block. This unique combination of query rewrite transformations results in the reduction of scalar and existential subqueries to join operations, as well as the elimination of redundant join operations, thereby providing superior performance.

Another object of the present invention is to prove, at query compilation, that a scalar subquery returns at most one row and that the scalar subquery does not return an empty set, so that the scalar subquery can be transformed into join operations, which can be merged or reduced into one or more query blocks. As a result, the present invention provides dramatically improved query execution time.

BRIEF DESCRIPTION OF THE DRAWINGS

Referring now to the drawings in which like reference numbers represent corresponding parts throughout:

FIG. 6 illustrates an updated FACT table used in the examples provided herein;

FIG. 9 is a query graph model that illustrates a scalar-to-join transformation after a subsumption test and view merge in the examples provided herein;

FIG. 10 is a query graph model that illustrates a redundant join transformation in the examples provided herein.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Hardware Environment

Figure 1:
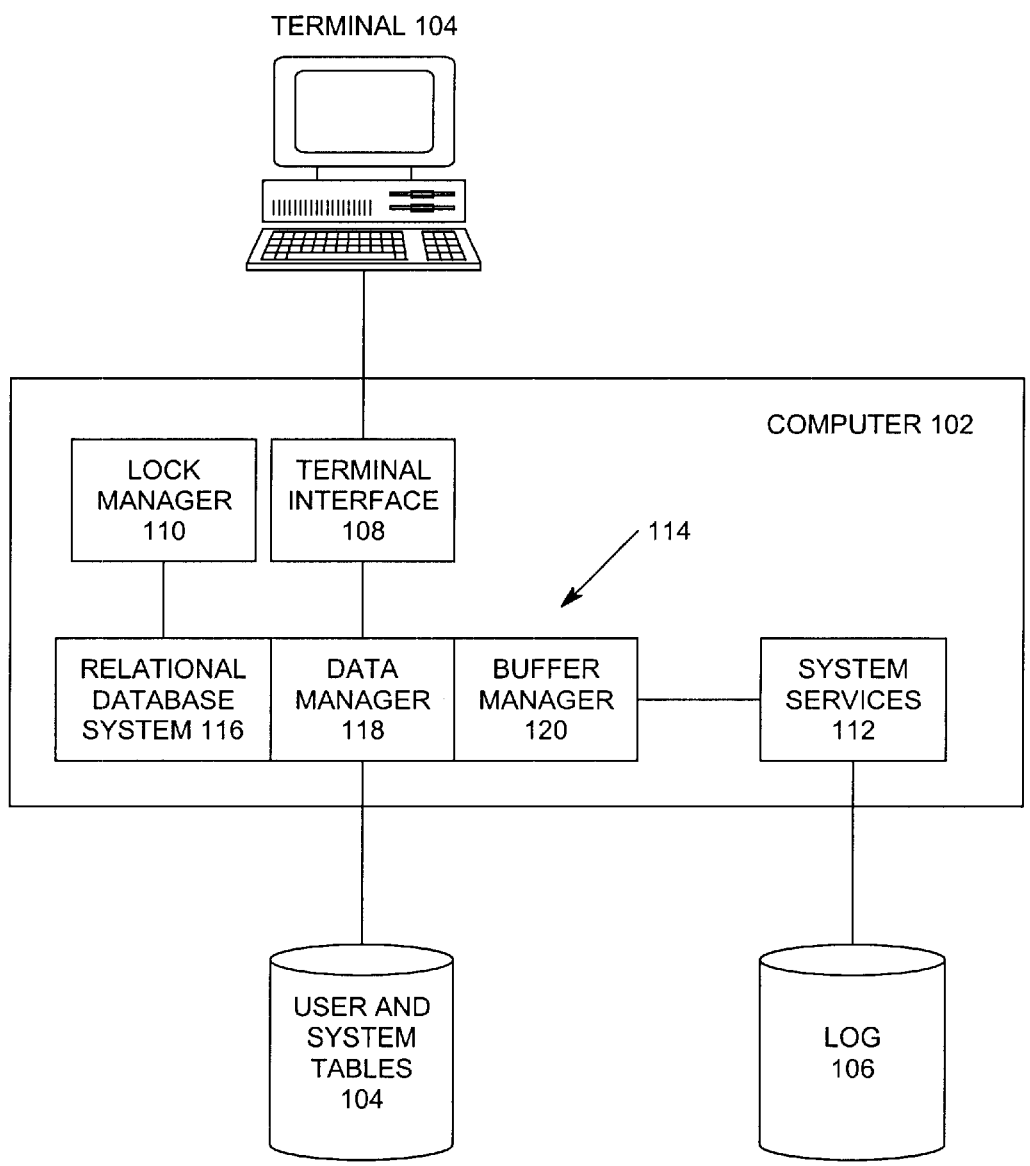
FIG. 1 illustrates the computer hardware environment of the present invention.

FIG. 1 illustrates an exemplary computer hardware environment that could be used with the present invention. In the exemplary environment, a computer system 102 is comprised of one or more processors connected to one or more electronic storage devices 104 and 106, such as disk drives, that store one or more relational databases.

Operators of the computer system 102 use a standard operator interface 108, such as IMS/DB/DC, CICS, TSO, OS/2 or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software. In the preferred embodiment of the present invention, the RDBMS software comprises the DB2 product offered by IBM for the MVS or OS/2 operating systems. Those skilled in the art will recognize, however, that the present invention has application to any RDBMS software.

As illustrated in FIG. 1, the DB2 product includes three major components: the IMS Resource Lock Manager (IRLM) 110, the Systems Services module 112, and the Database Services module 114. The IRLM 110 handles locking services, because DB2 treats data as a shared resource, thereby allowing any number of users to access the same data simultaneously, and thus concurrency control is required to isolate users and to maintain data integrity. The Systems Services module 112 controls the overall DB2 execution environment, including managing log data sets 106, gathering statistics, handling startup and shutdown, and providing management support.

At the heart of the DB2 architecture is the Database Services module 114. The Database Services module 114 contains several submodules, including the Relational Database System (RDS) 116, the Data Manager 118, and the Buffer Manager 120, as well as other elements such as an SQL compiler/interpreter. These submodules support the functions of the SQL language, i.e., definition, access control, retrieval, and update of user and system data.

Generally, each of the components, modules, and submodules of the RDBMS software comprise instructions and/or data, and are embodied in or retrievable from a computer-readable device, medium, or carrier, e.g., a data storage device, a remote device coupled to the computer 102 by a data communications device, etc. Moreover, these instructions and/or data, when read, executed, and/or interpreted by the computer 102, cause the computer 102 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture", or alternatively, "computer program carrier", as used herein is intended to encompass a computer program accessible from any computer-readable device, carrier, or media. Of course, those skilled in the art will recognize many modifications may be made to this configuration without departing from the scope of the present invention.

Those skilled in the art will recognize that any combination of the above components, or any number of different components, including computer programs, peripherals, and other devices, may be used to implement the present invention, so long as similar functions are performed thereby.

Interactive SQL Execution

Figure 2:
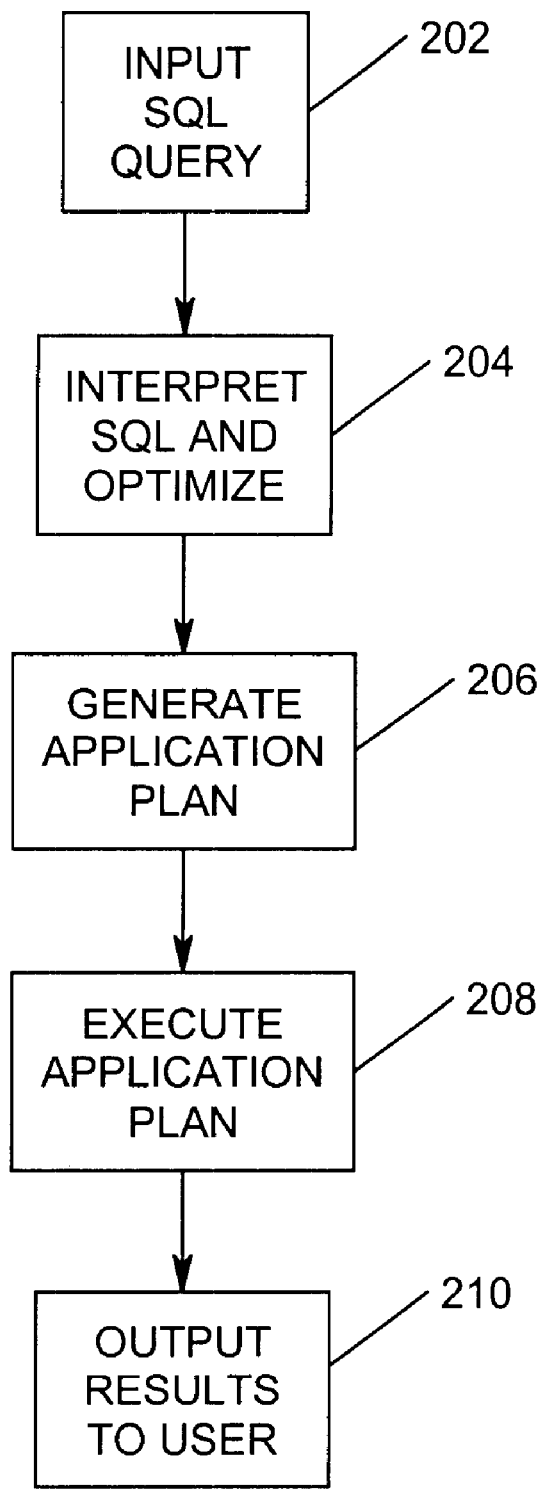
FIG. 2 is a flowchart illustrating the steps necessary for the interpretation and execution of SQL statements in an interactive environment according to the present invention.

FIG. 2 is a flowchart illustrating the steps necessary for the interpretation and execution of SQL statements in an interactive environment according to the present invention. Block 202 represents the input of SQL statements into the computer system 102. Block 204 represents the step of compiling or interpreting the SQL statements. An optimization function within block 204 may transform or optimize the SQL query in a manner described in more detail later in this specification. Block 206 represents the step of generating a compiled set of runtime structures called an application plan from the compiled SQL statements. Generally, the SQL statements received as input specify only the desired data, but not how to retrieve the data. This step considers both the available access paths (indexes, sequential reads, etc.) and system held statistics on the data to be accessed (the size of the table, the number of distinct values in a particular column, etc.), to choose what it considers to be the most efficient access path for the query. Block 208 represents the execution of the application plan, and block 210 represents the output of the results.

Embedded/Batch SQL Execution

Figure 3:
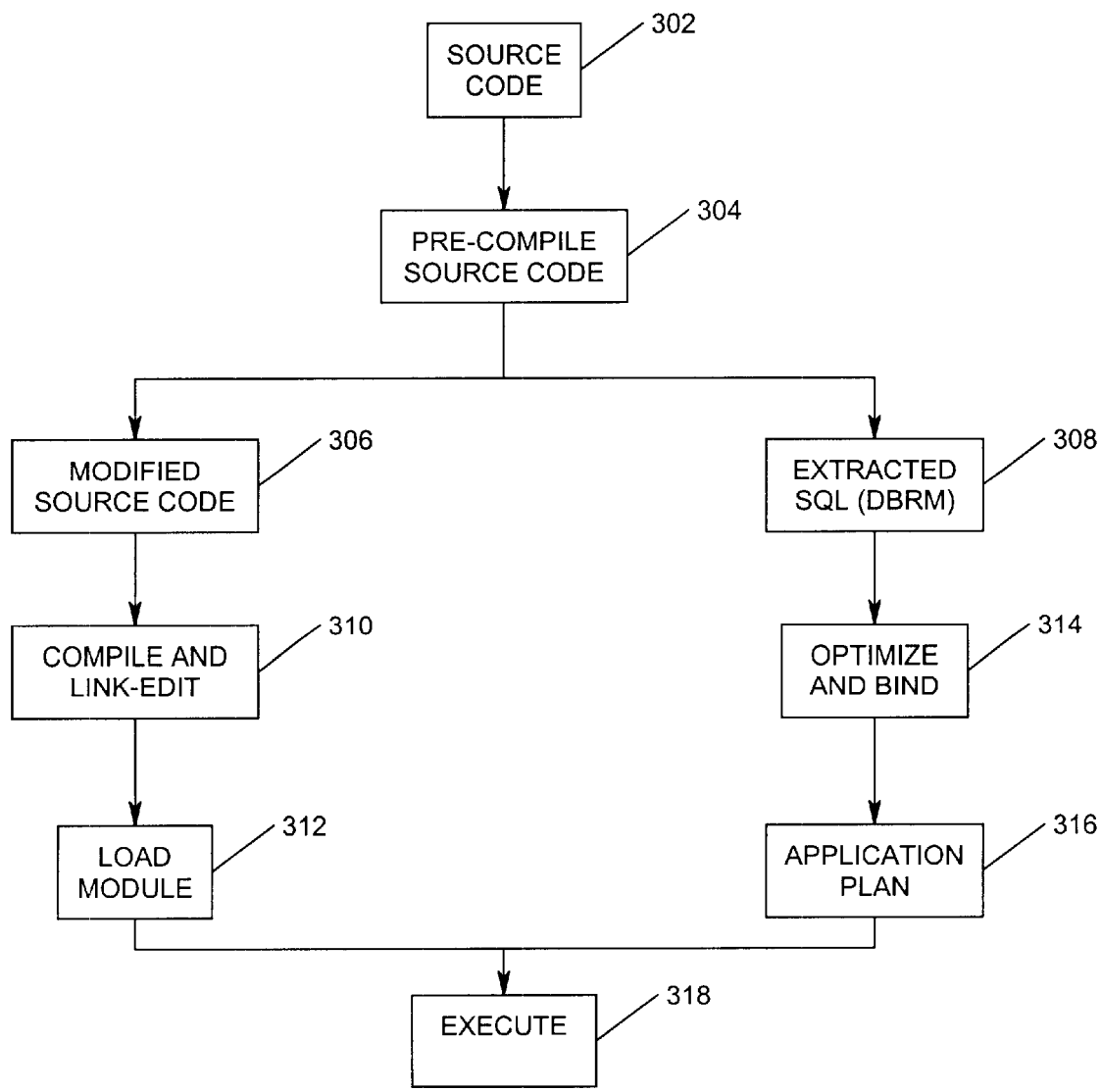
FIG. 3 is a flowchart illustrating the steps necessary for the interpretation and execution of SQL statements embedded in source code according to the present invention.

FIG. 3 is a flowchart illustrating the steps necessary for the interpretation and execution of SQL statements embedded in source code according to the present invention. Block 302 represents program source code containing a host language (such as COBOL or C) and embedded SQL statements. The program source code is then input to a pre-compile step 304. There are two outputs from the pre-compile step 304: a modified source module 306 and a Database Request Module (DBRM) 308. The modified source module 306 contains host language calls to DB2, which the pre-compile step 304 inserts in place of SQL statements. The DBRM 308 is comprised of the SQL statements from the program source code 302. A compile and link-edit step 310 uses the modified source module 306 to produce a load module 312, while an optimize and bind step 314 uses the DBRM 308 to produce a compiled set of runtime structures for the application plan 316. As indicated above in conjunction with FIG. 2, the SQL statements from the program source code 302 specify only the desired data, but not how to retrieve the data. The optimize and bind step 314 may reorder or optimize the SQL query in a manner described in more detail later in this specification. Thereafter, the optimize and bind step 314 considers both the available access paths (indexes, sequential reads, etc.) and system held statistics on the data to be accessed (the size of the table, the number of distinct values in a particular column, etc.), to choose what it considers to be the most efficient access path for the query. The load module 312 and application plan 316 are then executed together at step 318.

Description of the Optimization Technique

The present invention discloses an improved optimization technique that is typically performed at step 204 of FIG. 2 or step 314 of FIG. 3. This optimization technique analyzes a query to determine whether it includes one or more scalar subqueries and one or more existential subqueries. If so, the scalar subqueries and the existential subqueries are transformed into join operations, and the join operations are merged into a fewer number of query blocks (preferably a single query block).

The operation of the present invention can best be understood in context, i.e., using a real-world example, such as a data warehouse application performed by the RDBMS software. In such a data warehouse application, there typically exists a large table with one or more columns forming the primary or unique key of the table, or equivalently, there is a unique constraint on one or more columns of the table.

Figure 4:
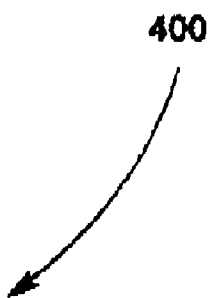
FIG. 4 illustrates a FACT table as used in the examples provided herein.

Consider a generic example of such a structure comprising a FACT table 400 as shown in FIG. 4, which may be created using the SQL statement that follows:

CREATE TABLE FACT (
  KEYCOL INT, /* KEY OR UNIQUE CONSTRAINT */
  COL1 INT,
  COL2 INT,
  COL3 INT)

The FACT table 400 has one key column (KEYCOL) and three additional columns (COL1, COL2 AND COL3), as well as multiple rows or tuples.

Note that the number of columns is irrelevant to the optimization techniques presented herein. Note also that the optimization is equally applicable to any data types as well as multi-column composite keys.

Figure 5:
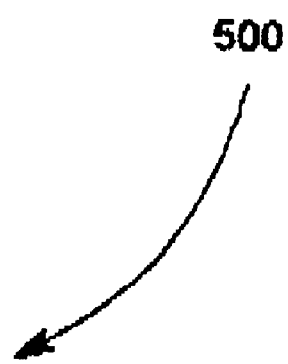
FIG. 5 illustrates a DELTA_FACT table used in the examples provided herein.

Periodically, the FACT table 400 is updated with new data set, which is often (although not always) smaller in size than the original FACT table 400. Typically, the new data set is stored in another table of similar schema, e.g., DELTA_FACT 500 as shown in FIG. 5.

In this example, the schema for DELTA_FACT 500 is slightly different from the FACT table 400, although in other embodiments the schema can be identical to the schema of the FACT table 400. Thus, the DELTA_FACT table 500 may be created by the following SQL statements:

CREATE TABLE DELTA_FACT (
  KEYCOL INT, /* KEY OR UNIQUE CONSTRAINT */
  COL1 INT,
  COL3 INT)

The DELTA_FACT table 500 stores the new data that is used to update the FACT table 400. For those rows with matching KEYCOL values, such as the row in FIG. 5 with KEYCOL equal to 30, the corresponding rows in the FACT table 400 have to be updated. The kind of update operation to the FACT table 400 is application-specific.

As an example, suppose new values in COL1 and COL3 are to be added to the corresponding rows in the FACT table 400. This could be accomplished by performing an UPDATE query using a correlated scalar subquery as follows:

UPDATE FACT F
  SET (COL1, COL3)=
    (SELECT F.COL1+D.COL1, F.COL3+D.COL3
    FROM DELTA_FACT D
    WHERE F.KEYCOL=D.KEYCOL)
  WHERE F.KEYCOL IN (SELECT KEYCOL FROM
    DELTA_FACT E)

Upon executing this UPDATE query, the FACT table contains the data shown in the query graph model 600 of FIG. 6. That is, for each row in the FACT table that is to be updated, the RDBMS software first determines whether the row is in the DELTA_FACT table, and if it is, a correlated scalar subquery is evaluated to retrieve the column values from the rows in DELTA_FACT. These retrieved values are then used to compute the result for the corresponding columns in the rows of the FACT table.

Figure 7A:
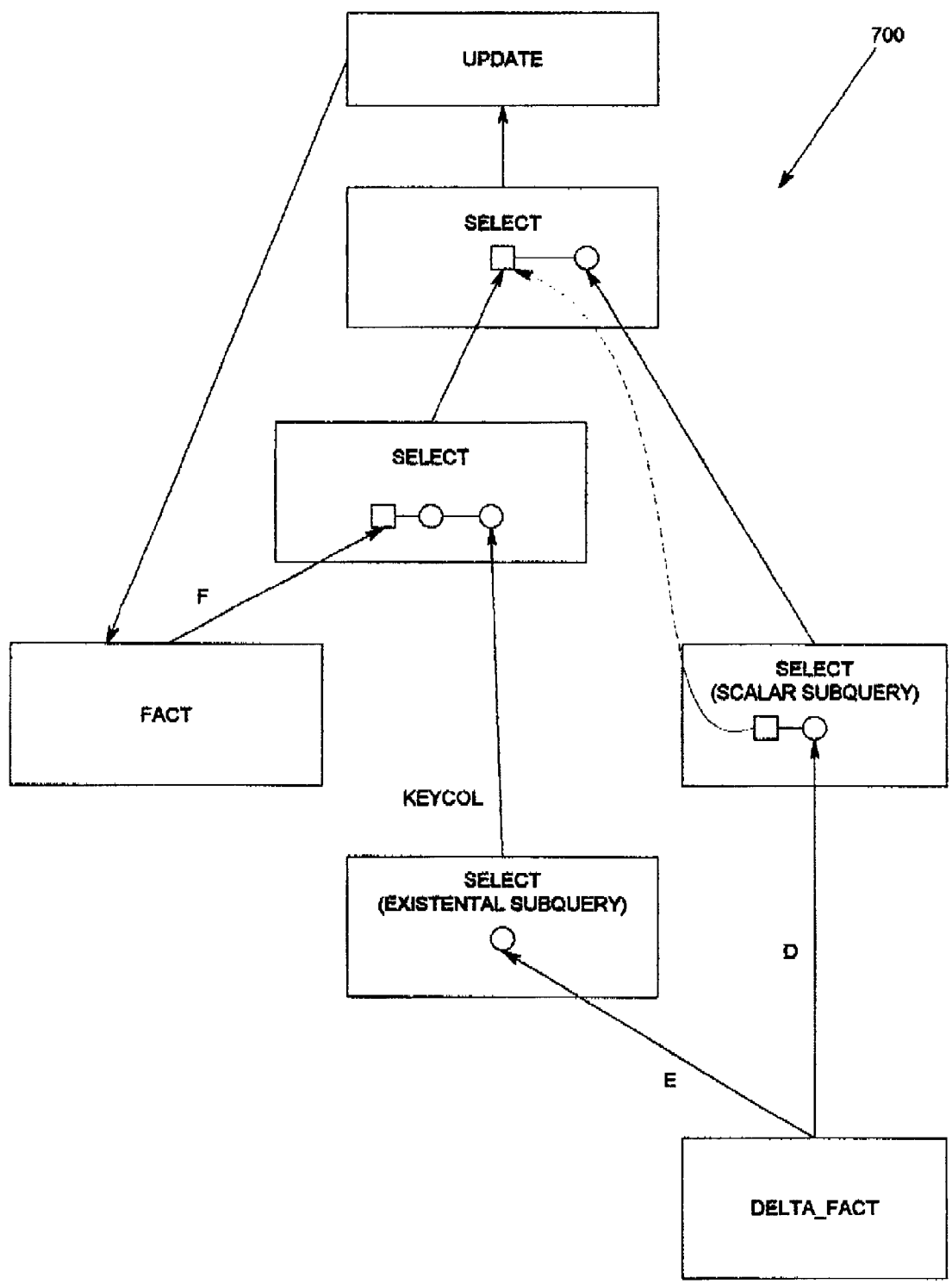
FIG. 7A is a query graph model that illustrates an UPDATE query used in the examples described herein.

FIG. 7A is a query graph model 700 that illustrates this evaluation strategy, wherein the model illustrates an execution hierarchy that is performed from the bottom up, each of the blocks represent a query or subquery block in the hierarchy, and the lines between blocks represent intermediate results that are provided from a lower-level block to a higher level block. The evaluation approach illustrated in FIG. 7A represents a non-optimized approach to performing the UPDATE query, which is typical of prior at RDBMS software. Rows from the FACT table is filtered using the existential subquery. For those FACT rows that are qualified, a correlated scalar subquery is evaluated to compute the result for the update SET clause.

In contrast, the present invention describes a method of optimizing the query in such a way that, in this example, the DELTA_FACT table is accessed only once instead of twice (i.e., once in the existential subquery and once in the scalar subquery). This is achieved by applying several query rewrite transformations to the query.

Figure 7B:
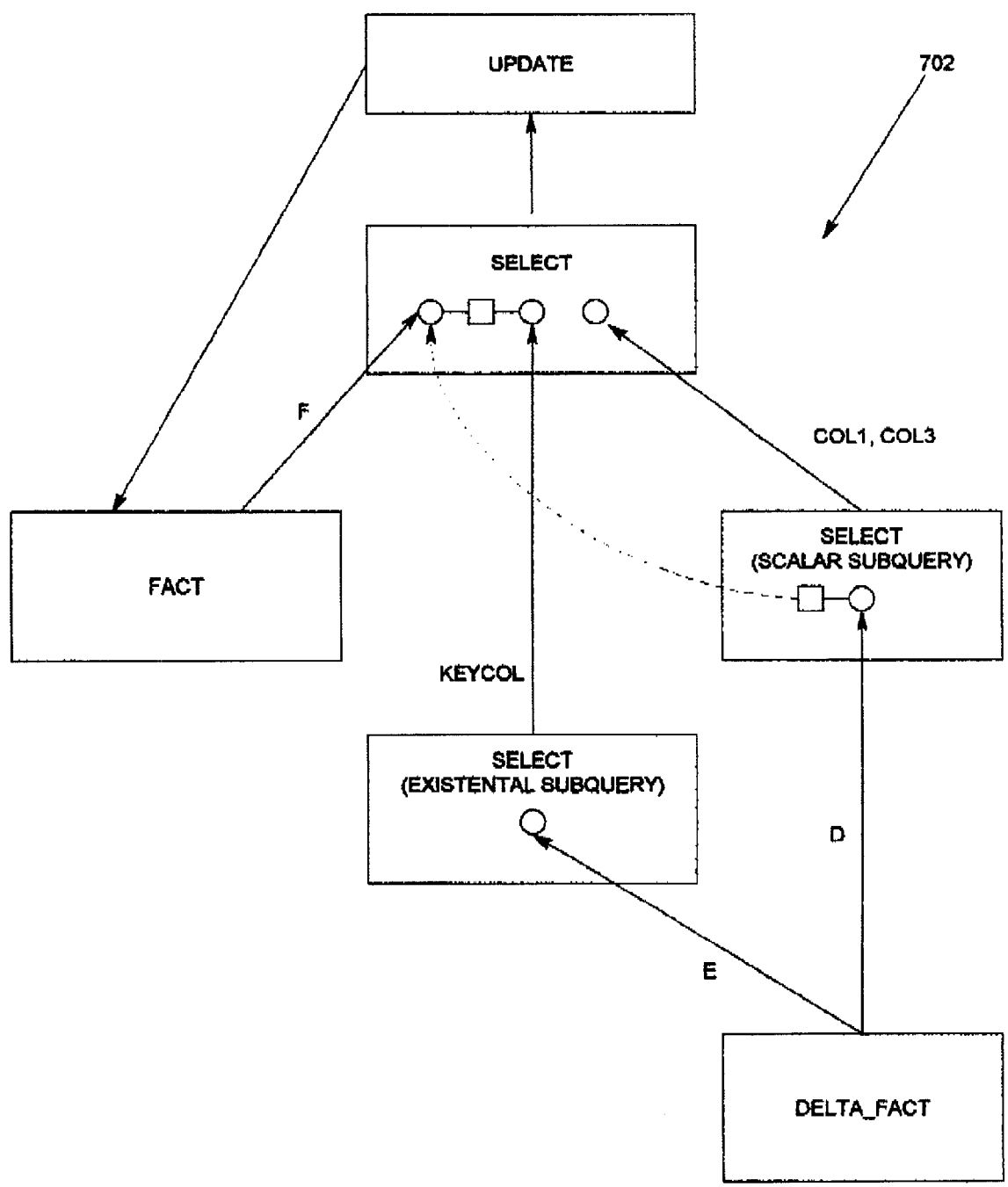
FIG. 7B is an optimized query graph model of FIG. 7A.

FIG. 7B is a query graph model 702 that illustrates an equivalent strategy where the filtering using the existential subquery is done in the same SELECT operation as in the computation of the update result. This optimization can be done using prior arts such as view merge.

Figure 7C:
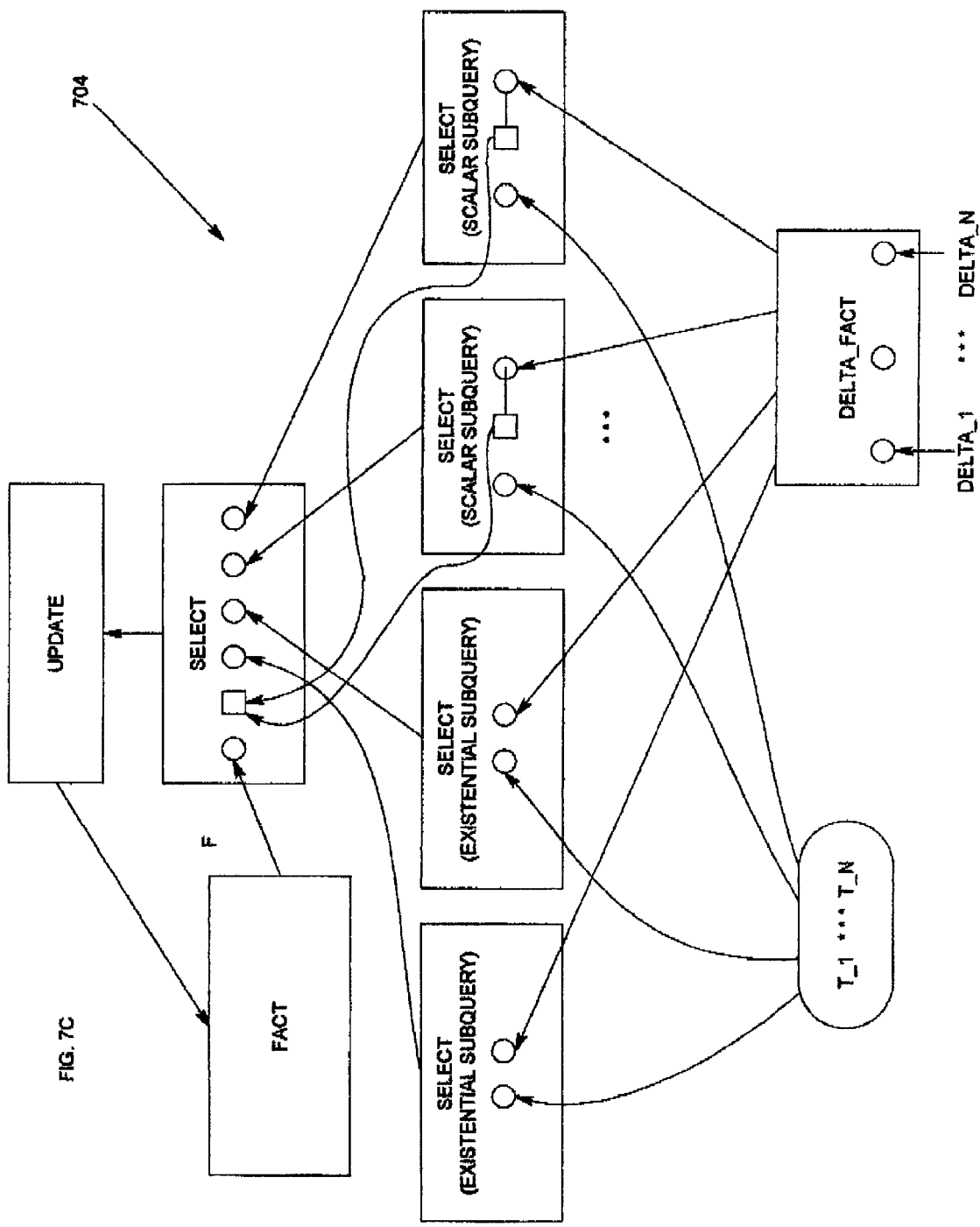
FIG. 7C is a query graph model that illustrates a general UPDATE query.

FIG. 7C is a query graph model 704 that illustrates a general form of update statement where there are multiple existential subqueries and multiple correlated scalar subqueries. For example, the techniques presented here can optimize the following update query:

```
UPDATE FACT F
SET COL1=(SELECT F.COL1+D1.COL1
    FROM DELTA_FACT1 D1
    WHERE F.KEYCOL=D1.KEYCOL)
COL3=(SELECT F.COL3+D2.COL1
    FROM DELTA_FACT2 D2
    WHERE F.KEYCOL=D2.KEYCOL)
WHERE F.KEYCOL IN (SELECT KEYCOL FROM
    DELTA_FACT1 E1)
AND F.KEYCOL IN (SELECT KEYCOL FROM
    DELTA_FACT2 E2)
```

A principle idea of the present invention is that the scalar subquery can be transformed into one join operation, the existential subquery can be transformed into one join operation and the join operations can be merged into a single query block allowing the redundant join to be eliminated and providing superior performance. However, it should be emphasized that the scalar subquery optimization technique is not restricted to UPDATE queries and is applicable to other types of queries as well.

Scalar subquery

By definition, a scalar subquery has two requirements. First, if the subquery returns more than one row, a runtime error will be generated. Second, if the subquery returns an empty set, a row with null value(s) will be returned instead.

For the above UPDATE query, the RDBMS software can prove, at compile time, that the scalar subquery returns at most one row, using techniques described in U.S. Pat. No. 5,615,361, issued Mar. 25, 1997, to T. Y. Leung, M. H. Pirahesh, D. E. Simmen, L. G. Strain and S. Tiwari, entitled "Exploitation of Uniqueness Properties using a 1-Tuple Condition for the Optimization of SQL Queries," which is incorporated by reference herein. The rationale is that for each row in the FACT table, the correlation predicate (F.KEYCOL=D.KEYCOL) will match at most one row in the DELTA_FACT table because D.KEYCOL is the primary key column in DELTA_FACT table. However, it must also be proven that if the subquery returns a null row, the returned null row will not change the answer set, and thus the scalar subquery can be transformed into a join operation, which can be merged into the same query block. The present invention proves both of these properties at query compilation time, performs the desired optimization, and, as such, dramatically improves query execution time.

The rationale for such optimization is that, for each row in the FACT table that satisfies the existential subquery (which could have been transformed into equivalent joins), the scalar subquery is evaluated using the same matching condition (e.g., joining on the KEYCOL column) and thus there must be exactly one match in the scalar subquery. In other words, even if a row in FACT table does not match any rows in the scalar subquery (i.e., the scalar subquery returns a null row), the null row will not be used and will not affect the answer set because the FACT row will not satisfy the existential subquery. Hence, the scalar subquery can be safely converted into a join operation. In fact, as long as the matching condition in the existential subquery is more restrictive than the matching condition in the scalar subquery, there must have a match in the scalar subquery and therefore the requirement regarding the empty answer set (i.e., the null row) can be safely removed. Furthermore, the same argument applies to joins that are equivalent to the existential subqueries.

Existential subquery-to-join transformation

Subquery-to-join transformation has been studied extensively in the literature, as described in H. Pirahesh, J. M. Hellerstein, and W. Hasan, "Extensible/Rule Based Query Rewrite Optimization in Starburst," In Proceedings of ACM SIGMOD Conference, 1992, which is incorporated by reference herein.

Following is an example of such optimization. Consider a non-optimized SQL query as follows:

```
SELECT F.*
FROM FACT F
WHERE F.KEYCOL IN (SELECT D.KEYCOL
    FROM DELTA_FACT E)
```

The above existential subquery can be optimized and reduced into a join operation as follows:

```
SELECT F.*
FROM FACT F, DELTA_FACT E
WHERE F.KEYCOL=E.KEYCOL
```

Note that the existential subquery returns the key values (E.KEYCOL) and thus the join-transformed version of the query will produce the correct number of duplicates as in the original query.

Figure 8A:
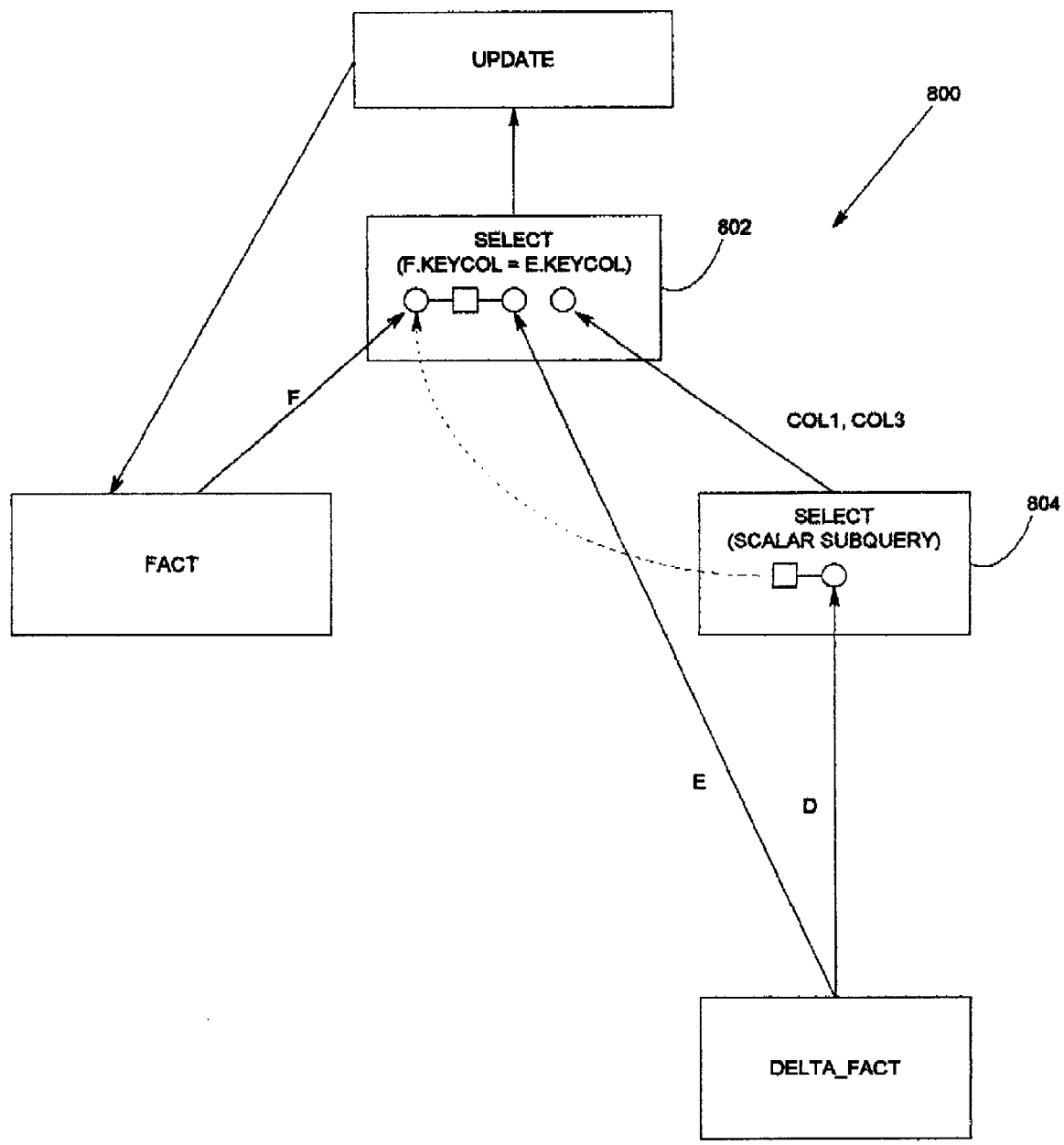
FIG. 8A is a query graph model that illustrates how an existential subquery is transformed into a join and merged into the main query block in the examples provided herein.

FIG. 8A is a query graph model 800 that illustrates, for the example UPDATE query, how the existential subquery is transformed into a join and merged into the main query block.

Subsumption.

Subsumption is a concept well known in the art. A SELECT box X is said to be subsumed by another SELECT box Y, if the result set of X is subset of the result set of Y. A simple situation is when the predicate set in box X is a superset of the predicate set in Y. That is, the SELECT box X will filter out more rows since it has more predicates than the box Y.

For example, consider the following queries L and M:

L: SELECT * FROM T WHERE C1>0 AND C2>0
M: SELECT * FROM T WHERE C1>0

The result set produced by L is a subset of the result set produced by M. The reason is that both queries select rows from the same table T (i.e., T is a common subexpression), and all predicates in M appear in L. Hence, M subsumes L.

Query subsumption in terms of predicate set can be defined as follows using query blocks. Assume that a SELECT box A with a single quantifier Q ranges over a common subexpression T, and another SELECT box B with a quantifier Q' ranges over the same table T, wherein the quantifiers Q and Q' comprise the table references of the SELECT boxes. If the predicate set in B is a subset of the predicate set in A, then A is subsumed by B. That is, all the rows produced by A can be found in the result set produced by B.

Referring to FIG. 8A, the SELECT box 802 has a quantifier E ranging over the DELTA_FACT table and the SELECT box 804 has a quantifier D ranging over the DELTA_FACT table. The predicate set in box 802 (F.KEYCOL=E.KEYCOL) is a superset of that in box 804 (in fact, all predicates in 802 appear in 804). Thus, if a tuple from F matches a row from E via the join predicate (F.KEYCOL=E.KEYCOL), the tuple must find a match in the scalar subquery via the correlation predicate (F.KEYCOL=E.KEYCOL). Recall that for each tuple in the FACT table (the quantifier F) the correlation predicate will match at most one row in the DELTA_FACT table (the quantifier E) via the 1-tuple condition. One can now prove that the scalar subquery can be safely transformed into a join. In general, the subsumption is true if the existential subquery has more predicates than the scalar subquery.

Figure 8B:
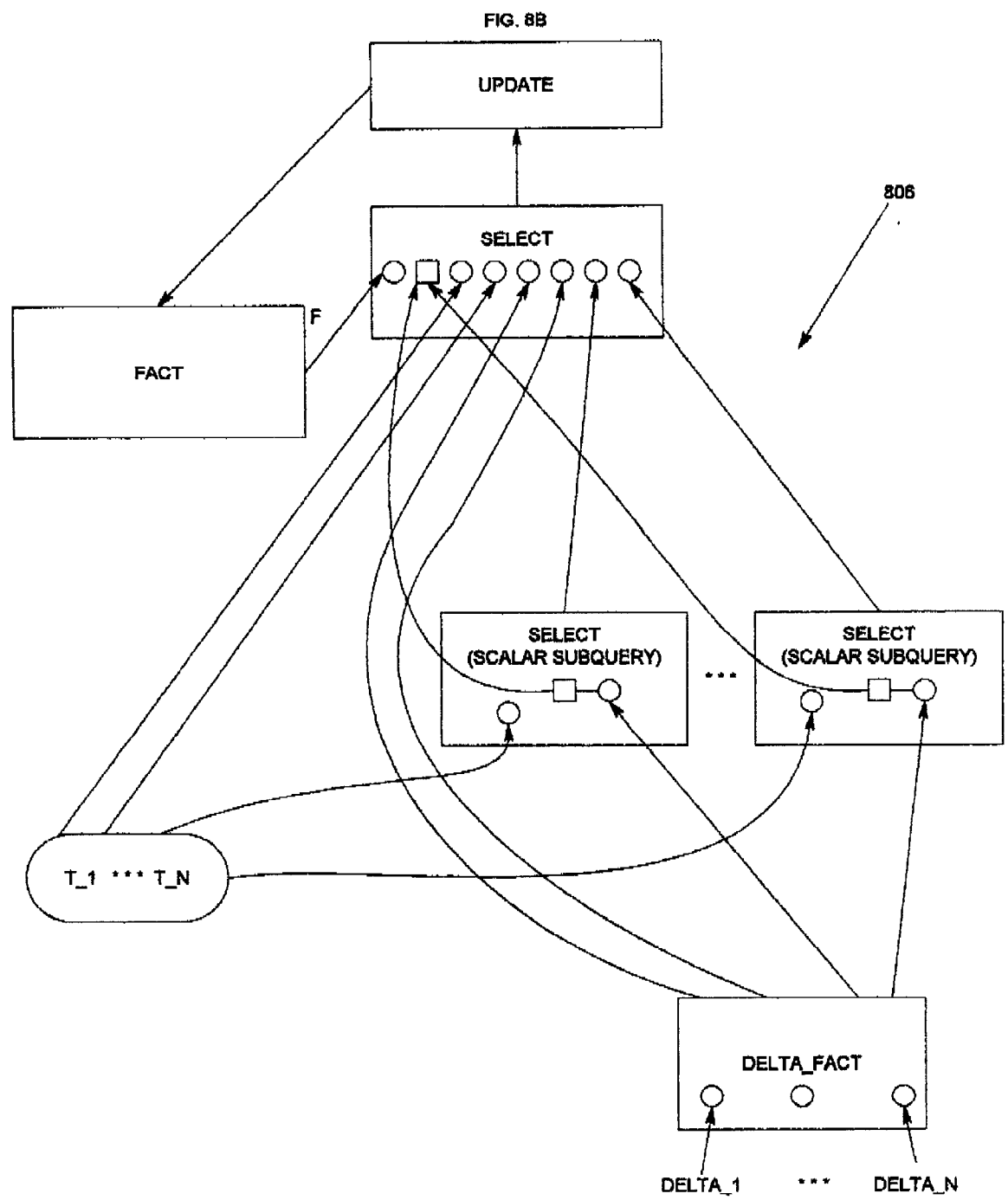
FIG. 8B is a query graph model that illustrates a general UPDATE query where existential subqueries are transformed into joins and merged into the main query block.

FIG. 8B is a query graph model 806 for the general UPDATE query illustrated in FIG. 7C, wherein existential subqueries have been converted into equivalent joins and merged into the main query block.

FIG. 9 is a query graph model 900 that illustrates the results of the scalar-to-join transformation after the subsumption test and view merge.

Redundant Join Elimination

Given a self-join on key columns, the self-join can be eliminated altogether. For example, consider the following example:

CREATE TABLE DEPARTMENT (
      DEPTNO INT NOT NULL PRIMARY KEY,
      MGRNO INT,
      DNAME . . . );
    CREATE TABLE EMPLOYEE (
      EMPNO INT NOT NULL PRIMARY KEY,
      LASTNAME . . . ,
      SALARY . . . ,
      BONUS . . . );

Assume that the following view and a query are created using the DEPARTMENT and EMPLOYEE tables:

CREATE VIEW MANAGER (MGRNO, INCOME) AS (
      SELECT E.EMPNO, E.SALARY
      FROM EMPLOYEE E, DEPARTMENT D
      WHERE E.EMPNO=D.MGRNO)
    SELECT E.LASTNAME, E.EMPNO
    FROM EMPLOYEE E, MANAGER M
      WHERE   E.EMPNO=M.MGRNO   AND
      M.INCOME>100K

After the view is merged (via standard query rewrite techniques), the query becomes:

SELECT E.LASTNAME, E.EMPNO
    FROM EMPLOYEE E, EMPLOYEE M, DEPARTMENT D
    WHERE E.EMPNO=M.EMPNO AND
      M.EMPNO=D.MGRNO AND
      M.SALARY>100K

It should be noted that the EMPLOYEE table is referenced twice and it is self-joined through its primary key column. Hence, the join is redundant and can be eliminated, resulting in the following optimized query:

SELECT E.LASTNAME, E.EMPNO
    FROM EMPLOYEE E, DEPARTMENT D
    WHERE   E.EMPNO=D.MGRNO   AND
      E.SALARY>100K

The technique of redundant join elimination has been described in H. Pirahesh, J. M. Hellerstein, and W. Hasan, "Extensible/Rule Based Query Rewrite Optimization in Starburst," Proceedings of ACM SIGMOD Conference, 1992, which is incorporated by reference herein.

For the above UPDATE query, the DELTA_FACT table is referenced twice and is self-joined through the KEYCOL column using column transitivity (D.KEYCOL= E.KEYCOL). Hence, the redundant join elimination can be applied to this self-join, resulting only one access to the DELTA_FACT table. The result from joining DELTA_ FACT and FACT tables is used for the UPDATE query, as shown in FIG. 10, which illustrates a query graph model 1000 with the resulting single query block after redundant join elimination. The corresponding rewritten form of the UPDATE query can be represented using the following Starburst syntax:

UPDATE FACT
    SET COL1=Q4.C2, COL3=Q4.C4, TID=Q4.C0
    FROM TABLE (SELECT Q5.TID, Q5.COL1+Q6.COL1,
      Q5.COL3+Q6.COL3
      FROM DELTA_FACT Q6, FACT Q5
      WHERE Q5.KEYCOL=Q6.KEYCOL)
      AS Q4 (C0, C2, C4)

That is, this rewritten form of the UPDATE query joins the FACT and DELTA_FACT tables and output the sum of COL1 columns in FACT and DELTA_FACT tables (and similarly the sum of column COL3). It also outputs the tuple identifier of FACT table so that it can be used for updating the FACT table. This rewritten form of the UPDATE query allows the optimization function of the RDBMS software to choose either the FACT or DELTA_FACT table as the outer table when the join is processed and to choose the appropriate join method using a cost-based approach. Without such query rewrite optimization, the optimizer would not be given such alternatives.

It should be emphasized again that the above query rewrite optimization for a scalar subquery can be applied independent of whether the subquery is part of an UPDATE query. Furthermore, all of the above steps can be combined into a single transformation. The primary key or unique key may comprise multiple columns, and the optimization is independent of data types as well as the number of columns in the FACT table.

Logic of the Optimization Technique

Figure 11:
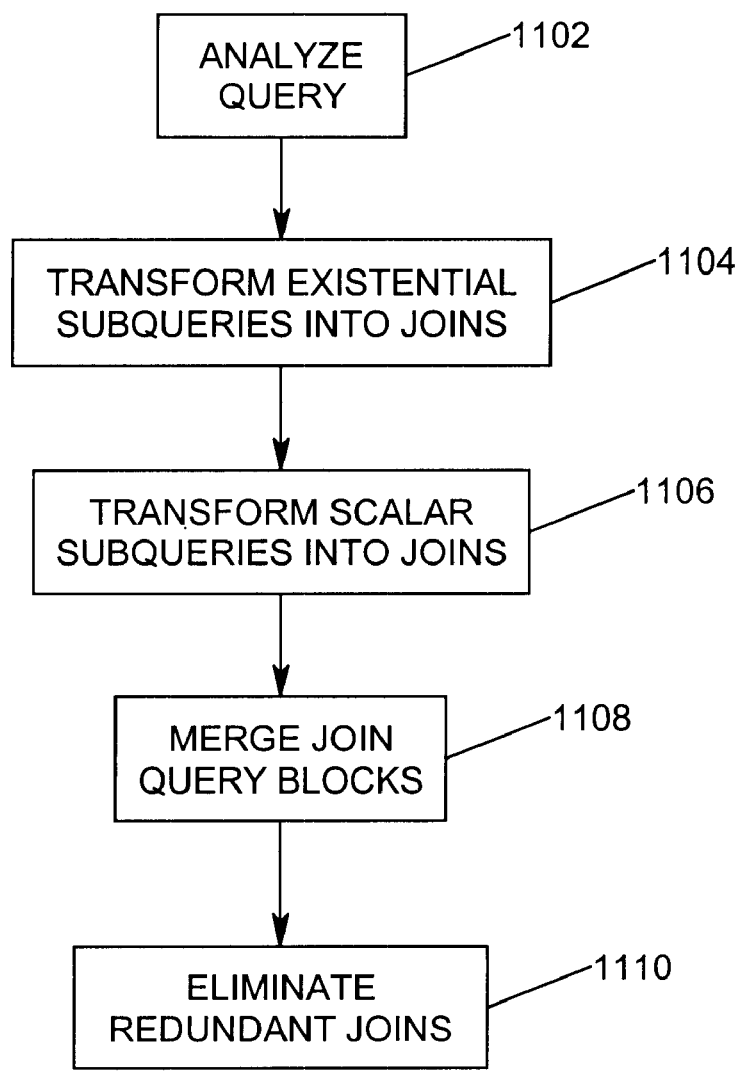
FIG. 11 is a flowchart illustrating the logic of optimizing SQL queries according to the present invention.

FIG. 11 is a flowchart illustrating the method of optimizing SQL queries in step 204 of FIG. 2 and step 314 of FIG. 3 according to the present invention.

Block 1102 represents the RDBMS software analyzing the SQL query in the memory of the computer 102.

Block 1104 represents the RDBMS software transforming existential subqueries into join operations.

Block 1106 represents the RDBMS software transforming scalar subqueries into join operations.

Block 1108 represents the RDBMS software merging join operations into a single query block.

Block 1110 represents the RDBMS software eliminate a redundant join on a table thereby providing superior performance.

After these query transformation steps are performed, block 1112 returns control to block 204 in FIG. 2 or block 314 in FIG. 3 for subsequent processing steps, including the execution of the SQL query against the relational database and the output of the result set.

Conclusion

This concludes the description of the preferred embodiment of the invention. The following describes some alternative embodiments for accomplishing the present invention. For example, any type of computer, such as a mainframe, minicomputer, or personal computer, could be used with the present invention. In addition, any software program adhering (either partially or entirely) to the SQL language could benefit from the present invention.

In summary, the present invention discloses a method, apparatus, and computer program carrier for optimizing SQL queries. A query is analyzed to determine whether it includes one or more scalar subqueries and one or more existential subqueries. The scalar subqueries and the existential subqueries are transformed into join operations, and the join operations are merged into a fewer number of query blocks. Redundant joins can be eliminated. The optimized query blocks can then be used to generate a superior execution plan to retrieve data from the relational database.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of optimizing a query in a computer, the query being performed by the computer to retrieve data from a relational database stored in a electronic storage device coupled to the computer, the method comprising the steps of:
   (a) analyzing the query in the computer to determine whether the query includes one or more scalar subqueries and one or more existential subqueries;
   (b) transforming the existential subqueries in the analyzed query into one or more join operations;
   (c) transforming the scalar subqueries in the analyzed query into one or more join operations;
   (d) merging the join operations into a single query block;
   (e) eliminating redundant join operations in the single query block; and
   (f) executing the query block in the computer to retrieve data from the relational database.

2. The method as set forth in claim 1 above, wherein the scalar subquery retrieves only one row from the relational database.

3. The method as set forth in claim 1 above, wherein a null row generated by the scalar subquery is not subsequently used to compute an answer set.

4. The method as set forth in claim 1 above, further comprising the steps of proving, when the query is compiled, that the scalar subquery retrieves at most one row from the relational database and that if the scalar subquery returns a null row when there is no match, the null row does not affect an answer set and therefore the scalar subquery can be transformed into a join operation.

5. The method as set forth in claim 4 above, wherein for each row retrieved from the relational database such that the scalar subquery is false, the row renders an evaluation of the existential subquery false, and hence a null row retrieved by the scalar subquery does not affect the answer set.

6. The method as set forth in claim 1 above, wherein the transforming step (c) further comprises the step of transforming the scalar subquery to a join operation using subsumption.

7. The method as set forth in claim 1 above, wherein the eliminating step (e) further comprises the step of merging the join operations using redundant join operation elimination.

8. The method as set forth in claim 7 above, wherein the redundant join operation comprises a self-join operation.

9. The method as set forth in claim 8 above, wherein the self-join operation is performed through a key column of a table from the relational database.

10. A method of optimizing a query in a computer, the query being performed by the computer to retrieve data from a relational database stored in a electronic storage device coupled to the computer, the method comprising the steps of:
    (a) analyzing the query in the computer to determine whether the query includes one or more scalar subqueries and one or more join operations;
    (b) transforming the scalar subqueries in the analyzed query into one or more join operations;
    (c) merging the join operations into a single query block;
    (d) eliminating redundant join operations in the single query block; and
    (e) executing the query block in the computer to retrieve data from the relational database.

11. The method as set forth in claim 10 above, wherein the scalar subquery retrieves only one row from the relational database.

12. The method as set forth in claim 10 above, wherein the scalar subquery does not generate a null row which is subsequently used to compute an answer set.

13. The method as set forth in claim 10 above, further comprising the steps of proving, when the query is compiled, that the scalar subquery retrieves at most one row from the relational database and that if the scalar subquery returns a null row when there is no match, the null row does not affect an answer set and therefore the scalar subquery can be transformed into a join operation.

14. The method as set forth in claim 13 above, wherein, for each row retrieved from the relational database such that the scalar subquery is false, the row renders an evaluation of the join operations false, and hence a null row from the scalar subquery does not affect the answer set.

15. The method as set forth in claim 10 above, wherein the transforming step (b) further comprises the step of transforming the scalar subquery to a join operation using subsumption.

16. The method as set forth in claim 10 above, wherein the eliminating step (d) further comprises the step of merging the join operations using redundant join operation elimination.

17. The method as set forth in claim 16 above, wherein the redundant join operation comprises a self-join operation.

18. The method as set forth in claim 17 above, wherein the self-join operation is performed through a key column of a table from the relational database.

19. An apparatus for optimizing a query, comprising:
    (a) a computer having an electronic storage device coupled thereto for storing a relational database, the query being performed by the computer to retrieve data from the relational database;
    (b) one or more instructions, performed by the computer, for analyzing the query in the computer to determine whether the query includes one or more scalar subqueries and one or more existential subqueries; for transforming the existential subqueries in the analyzed query into one or more join operations; for transforming the scalar subqueries in the analyzed query into one or more join operations; for merging the join operations into a single query block; for eliminating redundant join operations in the single query block; and for executing the query block in the computer to retrieve data from the relational database.

20. The apparatus as set forth in claim 19 above, wherein the scalar subquery retrieves only one row from the relational database.

21. The apparatus as set forth in claim 19 above, wherein a null row generated by the scalar subquery is not subsequently used to compute an answer set.

22. The apparatus as set forth in claim 19 above, further comprising one or more instructions for proving, when the query is compiled, that the scalar subquery retrieves at most one row from the relational database and that if the subquery returns a null row when there is no match, the null row does not affect an answer set and therefore the scalar subquery can be transformed into a join operation.

23. The apparatus as set forth in claim 22 above, wherein for each row retrieved from the relational database such that the scalar subquery is false, the row renders the evaluation of the existential subquery false, and hence a null row from the scalar subquery does not affect the answer set.

24. The apparatus as set forth in claim 19 above, wherein the instructions for transforming further comprise instructions for transforming the scalar subquery to a join operation using subsumption.

25. The apparatus as set forth in claim 19 above, wherein the instructions for eliminating further comprise one or more instructions for merging the join operations using redundant join operation elimination.

26. The apparatus as set forth in claim 25 above, wherein the redundant join operation comprises a self-join operation.

27. The apparatus as set forth in claim 26 above, wherein the self-join operation is performed through a key column of a table from the relational database.

28. An apparatus for optimizing a query, comprising:
   (a) a computer having an electronic storage device coupled thereto for storing a relational database, the query being performed by the computer to retrieve data from the relational database; and
   (b) one or more instructions, performed by the computer, for analyzing the query in the computer to determine whether the query includes one or more scalar subqueries and one or more join operations; for transforming the scalar subqueries in the analyzed query into one or more join operations; for merging the join operations into a single query block; for eliminating redundant join operations in the single query block; and for executing the query block in the computer to retrieve data from the relational database.

29. The apparatus as set forth in claim 28 above, wherein the scalar subquery retrieves only one row from the relational database.

30. The apparatus as set forth in claim 28 above, wherein the scalar subquery does not generate a null row which is subsequently used in computing an answer set.

31. The apparatus as set forth in claim 28 above, further comprising one or more instructions for proving, when the query is compiled, that the scalar subquery retrieves at most one row from the relational database and that if the scalar subquery returns a null row when there is no match, the null row does not affect an answer set and therefore the scalar subquery can be transformed into a join operation.

32. The apparatus as set forth in claim 31 above, wherein, for each row retrieved from the relational database such that the scalar subquery is false, the row renders an evaluation of the join operations false, and hence a null row from the scalar subquery does not affect the answer set.

33. The apparatus as set forth in claim 28 above, wherein the instructions for transforming further comprise one or more instructions for transforming the scalar subquery to a join operation using subsumption.

34. The apparatus as set forth in claim 28 above, wherein the instructions for eliminating further comprise one or more instructions for merging the join operations using redundant join operation elimination.

35. The apparatus as set forth in claim 34 above, wherein the redundant join operation comprises a self-join operation.

36. The apparatus as set forth in claim 35 above, wherein the self-join operation is performed through a key column of a table from in the relational database.

37. An article of manufacture embodying logic for performing method steps for optimizing a query, the query being performed by a computer to retrieve data from a relational database stored in a electronic storage device coupled to the computer, the method comprising the steps of:
   (a) analyzing the query in the computer to determine whether the query includes one or more scalar subqueries and one or more existential subqueries;
   (b) transforming the existential subqueries in the analyzed query into one or more join operations;
   (c) transforming the scalar subqueries in the analyzed query into one or more join operations;
   (d) merging the join operations into a single query block;
   (e) eliminating redundant join operations in the single query block; and
   (f) executing the query block in the computer to retrieve data from the relational database.

38. The method as set forth in claim 37 above, wherein the scalar subquery retrieves only one row from the relational database.

39. The method as set forth in claim 37 above, wherein a null row generated by the scalar subquery is not subsequently used to compute an answer set.

40. The method as set forth in claim 37 above, further comprising the steps of proving, when the query is compiled, that the scalar subquery retrieves at most one row from the relational database and that if the scalar subquery returns a null row when there is no match, the null row does not affect an answer set and therefore the scalar subquery can be transformed into a join operation.

41. The method as set forth in claim 40 above, wherein for each row retrieved from the relational database such that the scalar subquery is false, the row renders an evaluation of the existential subquery false, and hence the null row from the scalar subquery does not affect the answer set.

42. The method as set forth in claim 37 above, wherein the transforming step (c) further comprises the step of transforming the scalar subquery to a join operation using subsumption.

43. The method as set forth in claim 37 above, wherein the eliminating step (e) further comprises the step of merging the join operations using redundant join operation elimination.

44. The method as set forth in claim 43 above, wherein the redundant join operation comprises a self-join operation.

45. The method as set forth in claim 44 above, wherein the self-join operation is performed through a key column of a table from the relational database.

46. An article of manufacture embodying logic for performing method steps for optimizing a query, the query being performed by a computer to retrieve data from a relational database stored in a electronic storage device coupled to the computer, the method comprising the steps of:
   (a) analyzing the query in the computer to determine whether the query includes one or more scalar subqueries and one or more join operations;
   (b) transforming the scalar subqueries in the analyzed query into one or more join operations;

(c) merging the join operations into a single query block;

(d) eliminating redundant join operations in the single query block; and (e) executing the query block in the computer to retrieve data from the relational database.

47. The method as set forth in claim 46 above, wherein the scalar subquery retrieves only one row from the relational database.

48. The method as set forth in claim 46 above, wherein the scalar subquery does not generate a null row which is subsequently used to compute an answer set.

49. The method as set forth in claim 46 above, further comprising the steps of proving, when the query is compiled, that the scalar subquery retrieves at most one row from the relational database and that if the scalar subquery returns a null row when there is no match, the null row does not affect an answer set and therefore the scalar subquery can be transformed into a join operation.

50. The method as set forth in claim 49 above, wherein, for each row retrieved from the relational database such that the scalar subquery is false, the row renders an evaluation of the join operations false, and hence the null row from the scalar subquery does not affect the answer set.

51. The method as set forth in claim 46 above, wherein the transforming step (b) further comprises the step of transforming the scalar subquery to a join operation using subsumption.

52. The method as set forth in claim 46 above, wherein the eliminating step (d) further comprises the step of merging the join operations using redundant join operation elimination.

53. The method as set forth in claim 52 above, wherein the redundant join operation comprises a self-join operation.

54. The method as set forth in claim 53 above, wherein the self-join operation is performed through a key column of a table from the relational database.

* * * * *